UNITED STATES PATENT OFFICE.

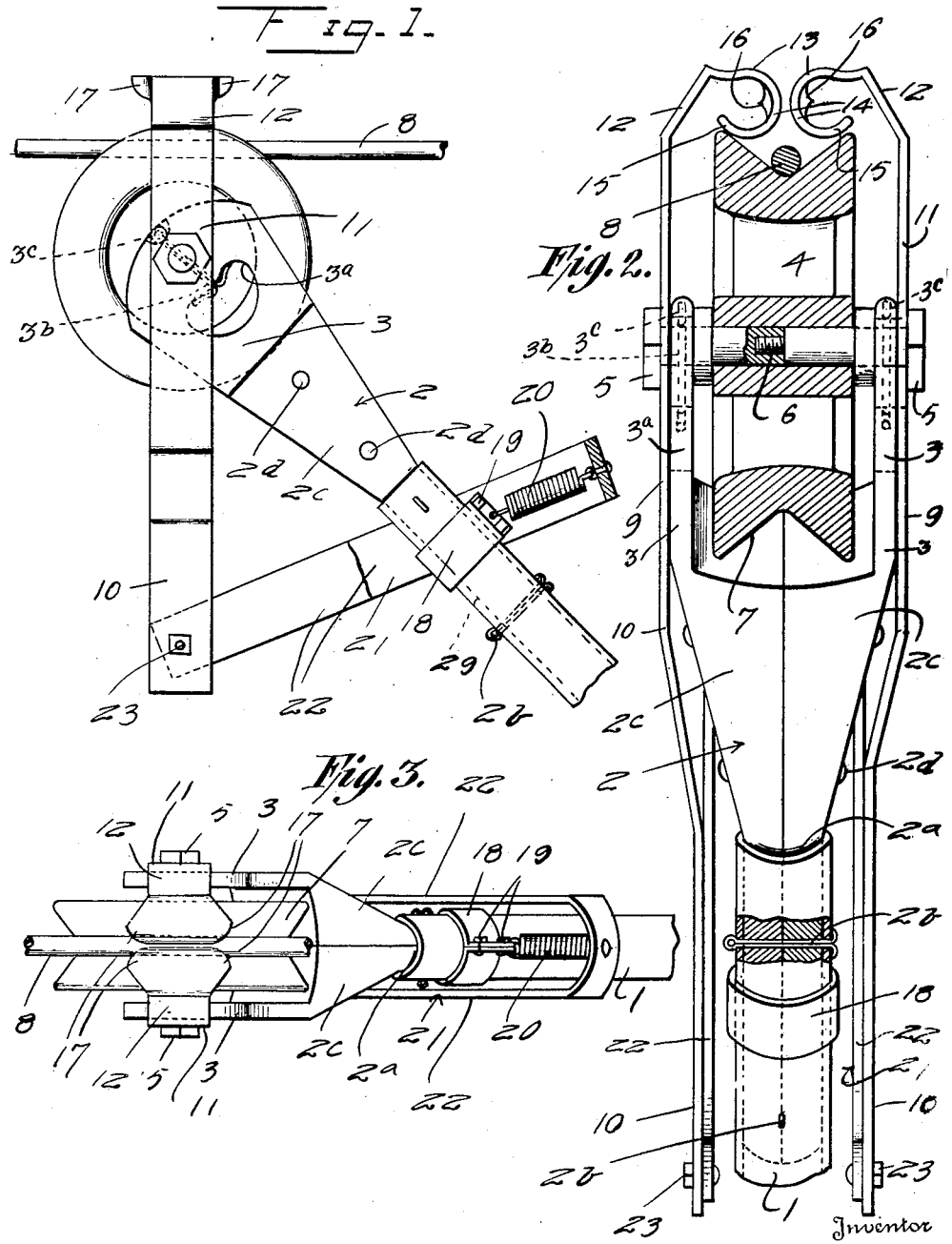

THEODORE L. MORTON AND JOHN E. IRWIN, OF NEW ORLEANS, LOUISIANA.

TROLLEY-GUARD.

1,355,561.	Specification of Letters Patent.	Patented Oct. 12, 1920.

Application filed September 2, 1919. Serial No. 321,114.

*To all whom it may concern:*

Be it known that we, THEODORE L. MORTON and JOHN E. IRWIN, citizens of the United States, residing at New Orleans, in the parish of Orleans and State of Louisiana, have invented certain new and useful Improvements in Trolley-Guards, of which the following is a specification, reference being had to the accompanying drawings.

This invention relates to an improved trolley guard for use in connection with trolley wheels, and an object of the invention is to provide a device of this kind for retaining the trolley wheel in engagement with the trolley wire and vice versa.

The invention further aims to provide a trolley guard which is capable of yielding in a direction with the trolley wire, in case the guard strikes an obstruction on the wire, such as the hangers for the wires.

A further object of the invention is to provide means connected to the trolley pole, and in turn connected to the guard, to permit the guard to yield in the direction of the trolley wire.

A further object of the invention is the provision of a trolley guard comprising opposing members, which have opposing yieldable parts, which are capable of yielding in a plane lateral to the trolley wire, to facilitate the passing of the guard over any obstruction, such as the hangers for the trolley wire. In fact, the opposing yieldable parts are capable of spreading in a plane laterally to the trolley wire, in order to pass over the hangers of the trolley wire.

The invention comprises further features and combination of parts, as will be hereinafter set forth, shown in the drawings and claimed.

In the drawings:

Figure 1 is a view in side elevation of a portion of a trolley pole, showing the same carrying a trolley wheel and in coöperation with the trolley wire, showing the trolley guard applied, and illustrating the spring tensioned yoke partly in section.

Fig. 2 is an elevation of a portion of a trolley pole and wheel at right angles to Fig. 1, showing the pole partly in section and the wheel in section.

Fig. 3 is a plan view, showing the overlying portions of the opposing yieldable parts of the trolley guard beveled or curved outwardly, preferably the latter, so as to permit the yieldable parts to spread, when they contact with an obstruction, such as the hangers on the trolley wire.

Referring more especially to the drawings, 1 designates a conventional form of trolley pole, and into the upper end of which a cylindrical extension $2^a$ of the trolley head 2 is telescopically inserted, there being a cotter pin $2^b$ extending transversely of the pole and through the extension $2^a$, thereby securely fastening the extension of the head in place. The trolley head has broad forks or spaced sides 3, which are positioned adjacent the opposite faces of the trolley wheel 4, which is arranged between the forks or sides. Mounted centrally through the opposing forks or sides of the trolley head are axially alined bolts 5. The adjacent ends of the bolts are connected, as for instance by the threaded extension 6 of one of the bolts. The trolley wheel 4 is usually the conventional design, and is provided with the usual annular groove 7, to be engaged by the trolley wire 8.

The trolley guard comprises the opposing members or straps 9, which are pivotally mounted upon the bolts 5, between the heads of the bolts and the outer faces of the forks or sides of the trolley head. These opposing members or straps have depending parts 10 and upwardly extending parts 11. The parts 11 are more or less yieldable, and are capable of slightly spreading and their upper portions curve inwardly and upwardly as shown at 12. The upwardly and inwardly curved portions 12 curve inwardly, downwardly and then outwardly, as shown at 13, 14 and 15, as shown clearly in Fig. 2. Where the portions 12 curve inwardly and downwardly toward each other, the portions 14 are opposed and in contact with each other, over the trolley wire 8. The outwardly curved portions 15 also overlie the trolley wire, and also overlie the marginal edges of the opposing flanges of the trolley wheel, thereby together with the contacting portions 14, act to retain the trolley wire in engagement with the groove of the trolley wheel. Where the opposing yieldable portions of the trolley guard proper are curved, at 13 and 14, the under faces of said portions are reinforced as shown at 16, by means of the ribs as shown. The opposite edges of the curved portions 14, are curved sufficiently above and below where they contact and outwardly from each other as shown at 17, so that the opposing guard members proper may spread apart in planes laterally to the trolley wire, particularly when the opposing guards proper contact with the trolley wire hangers (not shown). The opposing guards between the portions 11 and the curves 13 are designed to be thin enough to permit the opposing guards to readily yield or spread, when the parts 14 contact with the trolley wire hangers. However, the opposing trolley guards have sufficient rigidity to keep the trolley wire in firm engagement with the trolley wheel, as the car is in motion, particularly when traveling at a substantially high rate of speed.

A metallic split clamp 18 is fastened on the upper part of the trolley pole, by means of bolts 19, which pass through the opposing ends of the clamp, and connected to the ends of the clamp is a heavy tensioned coil spring 20. A sheet metal yoke 21 straddles the leg of the trolley head, substantially where the clamp 18 is secured, and the end parts of the legs 22 of said yoke are pivotally connected to the depending parts 10 of the trolley guards by any suitable means, as for instance bolts 23. The inner face of the loop end of the yoke 21 is provided with a suitable eye 24, to which the other end of the tensioned coil spring 20 is connected. This coil spring 20, when the trolley guard is in its normal position such as shown in Fig. 1, has its convolutions closed, that is substantially in firm contact, so as to hold the trolley guards in their initial positions. However, when the opposing trolley guards proper contact with a trolley wire hanger (not shown), or any other obstruction on the wire, and spread apart, the trolley guards are capable of yielding in a direction with the trolley wire, thereby putting the coil spring 20 under tension, so as to return the opposing trolley guards to their initial positions when the guards proper pass the hanger.

From the foregoing in connection with the accompanying drawings, it will be seen that an efficient and practical trolley guard has been devised, to hold the trolley wire in coöperation with the trolley wheel.

Furthermore, a trolley guard has been devised, which may be manufactured for a relatively low cost and sold at a reasonable profit, and one which will permit relative play between the trolley wheel and the trolley wire, and at the same time will not permit disengagement of the wheel from the wire under normal conditions.

The opposing forks of the trolley head are provided with openings $3^a$, and extending downwardly to elongated openings $3^b$ and through the axially alined bolts 5 are cotter pins $3^c$, thereby holding the axially alined bolts in position and against turning, and also assisting in preventing axial movement of the bolt. The openings $3^a$ are designed for the purpose of permitting the lower ends of the prongs of the cotter pins to be bent laterally as shown, to retain the cotter pins in position in the openings $3^b$.

The invention having been set forth, what is claimed as new and useful is:

1. The combination with a trolley head and a trolley wire, of a trolley wheel journaled in said head and in engagement with the wire, of opposing members pivotally mounted upon the head and having upwardly extending opposing yieldable parts curved upwardly and downwardly and partly overlying the wire and outwardly in opposite directions from the wire and in close positions with parts of the bevels of the flanges of the trolley wheel and partly overlying the edges thereof, thereby retaining the wire and the wheel in coöperative engagement, and thereby constituting trolley guards proper, the opposite edges of the trolley guards proper being curved outwardly to permit an obstruction to pass therebetween and spread the trolley guards, and means connecting between the lower parts of the opposing members and the head, to permit the trolley guards proper to yield in a plane with the trolley wire.

2. In a device as set forth, a trolley head, a trolley wheel journaled in said head for engagement with the trolley wire, opposing members pivotally mounted upon the head and having trolley wire guards overlying the wheel to retain the wire in engagement with the wheel, said trolley guards being yieldable laterally to the wheel, a U-shaped member arching the base of the head and being pivotally connected to the lower ends of said members, a coil spring connecting the cross piece of the U-shaped member and the base of the head, said coil spring when the convolutions thereof are closed in contact with each other act to limit the U-shaped member, whereby the pivoted members may be held in a vertical position, said pivoted members adapted to swing in a plane with the trolley wire thereby putting the coil spring under tension, which acts to restore said opposing members to their normal vertical planes.

In testimony whereof we hereunto affix our signatures.

THEODORE L. MORTON.
JOHN E. IRWIN.